United States Patent [19]

Johannessen

[11] Patent Number: 4,834,142

[45] Date of Patent: May 30, 1989

[54] FLOW RATE CONTROLLER

[75] Inventor: Jørgen M. Johannessen, Koge, Denmark

[73] Assignee: Jørgen Mosbaek Johannessen ApS, Køge, Denmark

[21] Appl. No.: 159,365

[22] PCT Filed: May 6, 1987

[86] PCT No.: PCT/SE87/00228

§ 371 Date: Mar. 2, 1988

§ 102(e) Date: Mar. 2, 1988

[87] PCT Pub. No.: WO87/07049

PCT Pub. Date: Nov. 19, 1987

[30] Foreign Application Priority Data

May 7, 1986 [SE] Sweden ................................ 8602091

[51] Int. Cl.⁴ ............................................... F15C 1/16
[52] U.S. Cl. ...................................... 137/813; 137/810
[58] Field of Search ................ 137/808, 810, 812, 813

[56] References Cited

U.S. PATENT DOCUMENTS

| 3,215,165 | 11/1965 | Boadway | 138/16 |
|---|---|---|---|
| 3,513,865 | 5/1970 | Van Der Heyden | 137/813 |
| 3,521,657 | 7/1970 | Ayers | 137/813 |
| 4,126,156 | 11/1978 | Barnes | 137/810 |
| 4,131,134 | 12/1978 | Lindberg | 137/813 |
| 4,206,783 | 6/1980 | Brombach | 137/813 |

FOREIGN PATENT DOCUMENTS

| 864884 | 5/1965 | Canada | 137/812 |
|---|---|---|---|
| 135904 | 7/1977 | Denmark . | |
| 512079 | 8/1981 | Denmark . | |
| 507713 | 9/1930 | Fed. Rep. of Germany . | |
| 3435477 | 3/1986 | Fed. Rep. of Germany . | |
| 2093946 | 2/1972 | France . | |
| 2436923 | 5/1980 | France | 137/813 |
| 85/00446 | 1/1985 | PCT Int'l Appl. . | |
| 1051503 | 10/1983 | U.S.S.R. | 137/808 |

Primary Examiner—A. Michael Chambers
Attorney, Agent, or Firm—Browdy & Neimark

[57] ABSTRACT

A flow rate controller including a braking chamber having an essentially centrally arranged outlet aperture and is adapted to receive, through a peripheral opening within the braking chamber, a liquid flow to be controlled, in order to brake the liquid by causing it to rotate within the braking chamber. For restricting the amount of liquid entering the peripheral opening per unit of time, the controller comprises the combination of a pipe member connected to the braking chamber and having a length such that a contraction of the cross-section of the liquid flow in the pipe member, caused by the deflection of the liquid flow over an inlet aperture at the free end of the pipe member, is fully developed in the region where the liquid flow in the pipe member encounters the essentially rotary liquid flow within the braking chamber and a liquid blocking means mounted in front of the inlet aperture in order to increase the deflection of the liquid flow at the inlet aperture, thereby to enhance the liquid flow contraction formed within the pipe member.

4 Claims, 4 Drawing Sheets

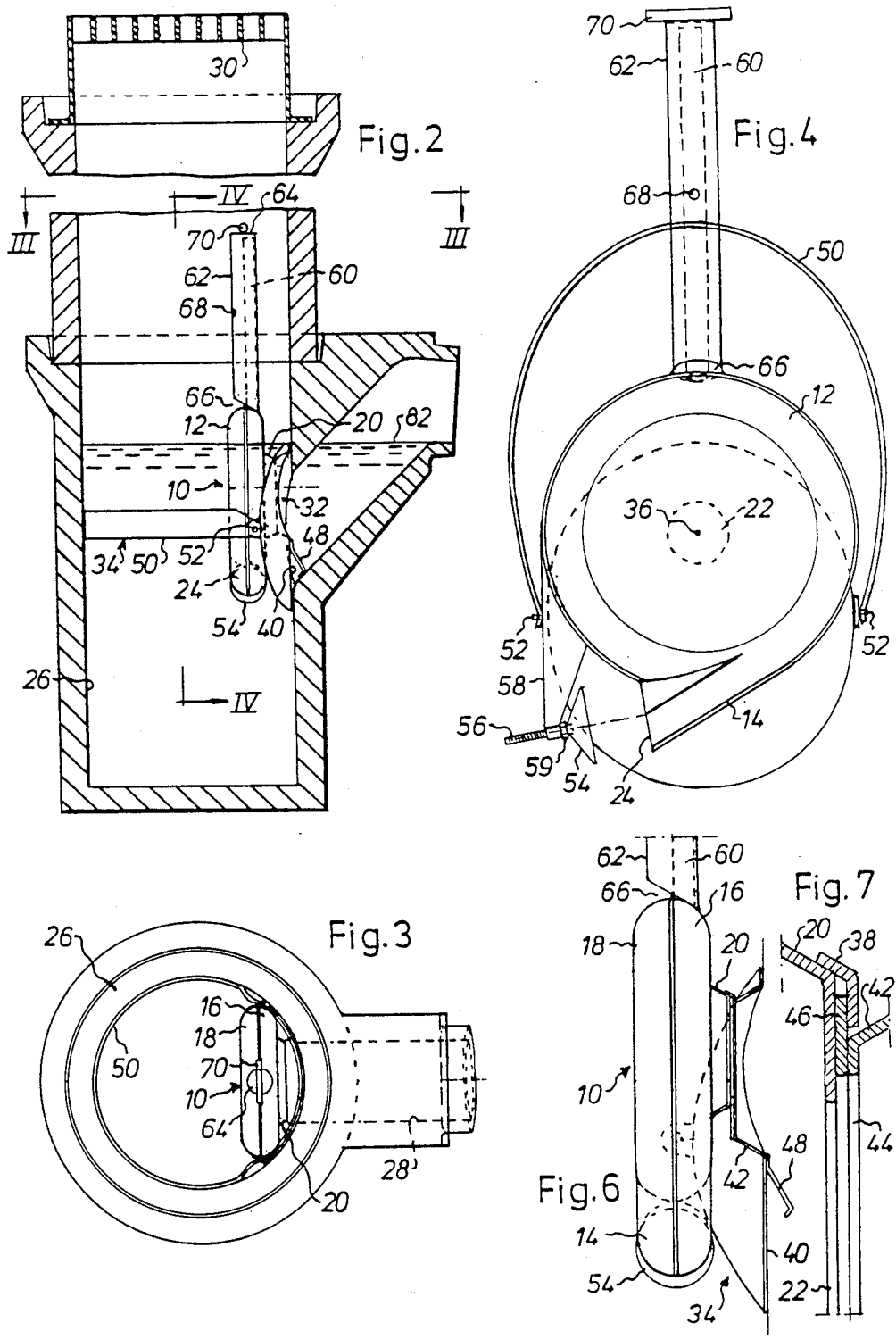

FLOW RATE CONTROLLER

BACKGROUND OF THE INVENTION

1. Field of the Invention

The present invention relates generally to flow rate controllers for controlling the liquid flow in a sewerage system or the like. More particularly, the invention relates to flow rate controllers of the type where the liquid flow to be controlled is braked by being set in rotary motion in a vortex or braking chamber.

2. The Prior Art

In, for example, a combined sewerage system where waste water and storm water are collected in common sewers, one wishes to avoid dimensioning the system according to the peak loads that may occur, for which reason use is usually made of some type of control to restrict the amount of liquid per unit of time discharged to the pipe system. If the pipe system is overloaded, and if there are no facilities for controlling the liquid flow to the system, a heavy rain for example may cause, in the waste water pipes connected to the pipe system, a back pressure from the cellars of residential buildings and cause flooding of the cellars. Such flow control ay be desirable also in separate sewerage systems.

It is already known, for flow control purposes, to utilise retardation stores, throttling pipes or level-controlled throttle valves. If, for example, the flow is controlled by means of a disk which is mounted in the pipe and has a small aperture through which the liquid is caused to pass, there is obtained through said aperture a liquid flow Q according to the formula $$Q = \mu A \sqrt{2gH} \tag{1}$$

in which A is the cross-sectional area of the aperture, H is the pressure head with respect to the centre of the aperture, g is the gravitational acceleration, and $\mu$ is a discharge coefficient which is about 0.6 for a sharp-edged aperture. A diagram shown in FIG. 1 illustrates by means of a curve K1 how the discharged liquid flow Q increases along a parabola when the liquid is dammed up in front of the apertured disk, i.e. when the pressure head H increases. The discharge curve K1 is here said to be unbraked.

In many cases, it is desired to be able, for a given pressure head H, to reduce the liquid flow Q without changing the throughflow area A because, if A is small, the risk of blocking the controller increases and may interfere with the proper functioning.

This desideratum is partly satisfied by the type of flow controller which is described in, for example, DK-C-135,904, DK-A-5120/79 and PCT application No. 84 902 583.8. These prior art flow controllers which are intended to be mounted for example at or in the outlet duct of a gully for limiting the amount of liquid discharged per unit of time from the gully to a sewerage system, comprises a braking chamber which is symmetrical with respect to rotation and has a central outlet aperture. Flow control is achieved by conducting the liquid tangentially into the braking chamber at the periphery thereof perpendicular to the outlet direction, whereby the liquid is set in rotary motion in the braking chamber and then leaves the controller through the outlet aperture. In this manner, the major part of the pressure energy of the liquid is converted into rotational energy, i.e. the liquid flow is braked and the discharged amount of liquid per unit of time Q is reduced. With these prior art flow controllers, it is possible, with the same free aperture A as in the above-mentioned case where the aperture has a sharp edge, to reduce the $\mu$-value considerably, as illustrated in FIG. 1 by the curve K2 which here is said to be braked.

It thus is the object of these prior art vortex brake type flow controllers to achieve a relatively large throughflow area in the controller so that the controller becomes reliable in operation and is not blocked by impurities in the liquid, and thereby to establish a large hydraulic resistance, i.e. a low $\mu$-value.

Nevertheless, the vortex brake type flow controllers described above suffer from several disadvantages. In the first place, the braking effect, and thus the capacity of said flow controllers, is limited by the physical size of the controller, which frequently causes difficulties in the mounting of the controller in the relatively narrow spaces of sewerage systems. It therefore is desired to be able to increase the braking effect while retaining the size of the controller.

A second disadvantage of the known vortex brake type flow controllers is that, in order to cover all the requirements of the market, one is compelled to stock an extensive range of controllers in different sizes because a controller of a given size is optimal only for a given Q-value and a given H-value.

It therefore is desirable to be able to control very small and, at the same time, highly varying amounts of liquid per unit of time with varying pressure heads with as few controller sizes as possible.

SUMMARY OF THE INVENTION

It is the main object of this invention to provide a flow controller having a much improved braking effect while retaining the advantages of prior art vortex brake type flow controllers, i.e. while retaining an advantageous braking characteristic, but with an essentially increased throughflow area in the controller.

This object is achieved according to the invention with a flow controller having the characteristic features stated in claim 1.

The present invention thus provides for a very substantial contraction of the cross-sectional area of the inflowing liquid. This contraction is achieved by means of a combination of two elements, viz. on the one hand an inlet pipe member formed as a so-called Bordas pipe and, on the other hand, a liquid blocking means disposed in front of said inlet pipe member. The inlet pipe member connects onto a peripheral aperture in the braking chamber of the controller and constitutes an essentially tangential extension of the braking chamber periphery, the free terminal edge, or parts thereof, of the circumference of the pipe member defining the inlet aperture of the controller. By this construction, the liquid flowing in from the side or from behind is deflected over the edge of the aperture and then continues its flow within the inlet pipe member at a distance from the inner side thereof. This contraction makes it possible to reduce the cross-sectional area of the inlet jet by almost 50% as compared with the cross-sectional area of the inlet aperture. The length of the pipe member should be selected such that the contraction is fully developed, i.e. the liquid flow has its minimum cross-sectional area, in the region where the contracted liquid flow in the inlet pipe member encounters the liquid flow rotating within the braking chamber. The cross-sectional area of the contracted liquid flow within this region where the two liquid flows meet, is termed below the active cross-sectional area.

To enhance the contraction of the liquid flow within the inlet pipe member, the controller according to the invention comprises also a liquid blocking means which is mounted at a distance from the pipe member in front of the inlet aperture and which prevents liquid flow directly from in front to the inlet aperture and forces the liquid flow which otherwise would have entered directly from in front to enter from the side or from the rear and to be deflected at the edge of the inlet aperture, whereby the liquid flow contraction established in the inlet pipe length is enhanced considerably.

The distance between the liquid blocking means and the plane of the inlet aperture preferably is variable for adjustment of the desired braking effect.

According to a special variant of the invention, the contraction is further increased when the inlet portion of the pipe member, including the inlet aperture, is built into a housing which comprises a rear wall in sealing engagement with the braking chamber or the pipe member behind the inlet aperture, a tubular wall extending from the rear wall toward and past the liquid blocking means, and one or more liquid passage openings disposed between the liquid blocking means and the tubular wall, said liquid passage openings being designed such that the liquid flow is directed in a path essentially parallel to the pipe member past the liquid blocking means and the inlet aperture, whereupon it follows an essentially S-shaped path toward the rear wall, back to the inlet aperture of the pipe member, and over the edge of said inlet aperture.

In this manner, the flow rate will be higher, and almost the entire liquid flow is forced to arrive from the rear at a higher rate closely adjacent the outer side of the pipe member to finally describe a 180° curve at the edge of the inlet aperture, whereby maximum contraction is obtained.

In another variant of the present invention, the said liquid passage openings have been replaced by a single large liquid passage opening which is provided in such a position in the side of the last-mentioned housing that the entire liquid flow is conducted toward the inlet aperture of the pipe member from the side. Because of the larger liquid passage opening, this variant affords the advantage that larger objects can pass freely through the entire arrangement without blocking it.

It should also be noted that the liquid blocking means, besides enhancing the contraction in the inlet pipe member, also prevents larger flat objects from placing themselves across the entire inlet aperture where such objects, if there were no liquid blocking means, could support themselves permanently over the entire circumference of the inlet aperture. If the liquid blocking means is used, such flat objects never have time to cover the entire inlet aperture because they have before then been sucked toward the edge and carried away by a "rotary" pressure exerted by the liquid flow.

In comparison with prior art vortex brake type flow controllers, most of which have a fully developed active cross-sectional area, the present invention, because of the combination of the contraction-forming inlet pipe member and the contraction-enhancing liquid blocking means, provides for a considerable reduction of the active cross-sectional area, and this provides for a corresponding increase of the total braking effect of the controller because the centrifugal force acting upon the liquid within the braking chamber, and thus the braking effect obtained by the rotation, are approximately proportional to the square of the velocity of the inflowing liquid to the braking chamber, and this velocity in turn is proportional to the square root of the pressure head. Thus, there is obtained for a given pressure head, essentially the same inflow velocity, with or without contraction, but since the active cross-sectional area in the former case is essentially smaller, the amount of liquid per unit of time passing through the active cross-sectional area will, according to formula (1), also be essentially smaller, i.e. the liquid is braked. This is illustrated by curve K3 in FIG. 1.

Thus, the total braking effect of the flow controller according to the invention consists on the one hand of the braking effect which, in known manner, is obtained by liquid rotation within the braking chamber (curve K2) and, on the other hand, by the braking effect which, according to the invention, is obtained by the contraction in the inlet pipe member, in combination with the contraction-enhancing effect achieved by the liquid blocking means mounted in front of the inlet aperture.

It should be mentioned in the context that a flow controller having a circularly symmetrical braking chamber and a pipe member projecting tangentially from the braking chamber is disclosed in DE No. 3,435,477 filed on Sept. 27, 1984 by Brombach who does not, however, mention any contraction effect of the kind referred to, nor the use of a liquid blocking means in front of the inlet aperture for enhancing the contraction.

Other characteristic features of the invention and preferred embodiments thereof are disclosed in the nonindependent claims.

BRIEF DESCRIPTION OF THE DRAWINGS

The basic design of the invention and improvements thereon will now be described in more detail, reference being had to the embodiments illustrated in the accompanying drawings, in which:

FIG. 2 is a lateral view of a first embodiment of a flow controller according to the invention, which is clamped by means of a special mounting unit in a gully in front of a sewer pipe.

FIG. 3 is a view as seen from above along line III—III in FIG. 2.

FIG. 4 is a side view along line IV—IV in FIG. 2.

FIGS. 6 and 7 show the details of a mounting unit for the flow controller in FIGS. 2-4.

DETAILED DESCRIPTION OF THE PREFERRED EMBODIMENT

Figure 1:
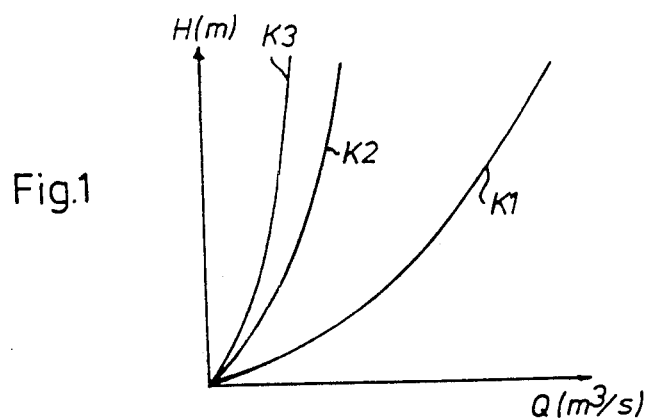
FIG. 1 is a diagram showing the braking effect of prior art flow controllers and a flow controller according to the invention.

Reference is now made to FIGS. 2-4 which illustrate a flow controller generally designated 10 and substantially comprising a flat cylindrical braking chamber 12 of essentially known design as well as a tangentially projecting pipe member 14 connected to the braking chamber 12. The braking chamber 12 is defined by two cup-shaped end walls 16 and 18 (FIG. 3), of which the end wall 16 has a frustoconical portion 20 tapering in the direction away from the braking chamber 12 and opening in an outlet aperture 22. The inlet to the flow controller is an inlet aperture 24 in the free end of the pipe member 14.

The flow controller shown in FIGS. 2–4 is mounted in a gully 26 having an outlet duct 28 and a grating 30 which is positioned at the top of the gully and through which storm water can flow down into the gully 26. The flow controller 10 is mounted at the opening 32 of the outlet duct 28 facing the gully 26 by means of a mounting unit generally designated 34, such that the line of symmetry 36 of the controller lies horizontally with the inlet aperture 24 located below the braking chamber 12. To secure the mounting unit 34 in the gully 26, the above-mentioned frustoconical portion 20 on the end wall 16 is provided at its top and at its sides with a coupling flange 38 whose appearance is illustrated in more detail in FIG. 7 which on a larger scale illustrates the manner in which the flow controller is mounted.

As is best seen from FIG. 6, the mounting unit 34 comprises a bent flange 40 and a frustoconical enlargement 42 having an opening 44 which is larger than the outlet aperture 22. The frustoconical portion 42 has at the peripheral edge of the opening 44 a radially projecting flange 46 which, when the controller 10 is mounted, is inserted in a space between the frustoconical portion 20 of the controller 10 and the coupling flange 38, as will appear from FIG. 7. The flanges 40 and 46 may be provided with gaskets. The flange 40 also has a supporting leg 48 which in mounted position engages the inner side of the outlet duct 28, and a clamping yoke 50 hingedly connected (at 52) with the flange 40. The clamping yoke 50 may optionally be replaced by a supporting leg extending from the flange 40 down toward the bottom of the gully, in which case the supporting leg 48 instead engages the inner side of the upper part of the outlet duct 28.

The flow controller shown in FIGS. 2–4 further has a liquid blocking means which is mounted in front of the inlet aperture 24 of the inlet pipe member 14 and which, in this embodiment, is in the form of a conical disk 54. At its side facing away from the inlet aperture 24, the disk is fixedly connected with one end of a threaded shaft 56 which via a corresponding threaded bush (not shown) is supported by a holder 58 fixedly connected with the braking chamber 12. This construction makes it possible to set a desired spacing between the blocking disk 54 and the inlet aperture 24. The blocking disk 54 can be locked in the desired position by means of a locking nut 59. The function of the liquid blocking means 54 will be explained in more detail below.

The flow controller shown in FIGS. 2–4 also comprises, although this does not form part of the invention, a specially designed venting device which is especially useful when, in order to achieve a high braking effect, controllers must be used which have a large diameter and require complete venting in order to achieve maximum braking effect. The venting device comprises an inner pipe 60 which communicates at its lower end with the upper part of the braking chamber 12 and which is open at its upper end, and an outer pipe 62 surrounding said inner pipe 60. The upper end of the outer pipe 62 is closed by means of a plate 64 and located at a distance above the upper edge of the inner pipe 60. As shown at 66 in FIGS. 2, 4 and 6, the lower end of the outer pipe 62 is open. The outer pipe 62 may have additional venting holes 68, and the plate 64 may b provided with a special gripping means 70 for mounting and dismounting the flow controller 10 in the mounting unit 34.

Figure 5:
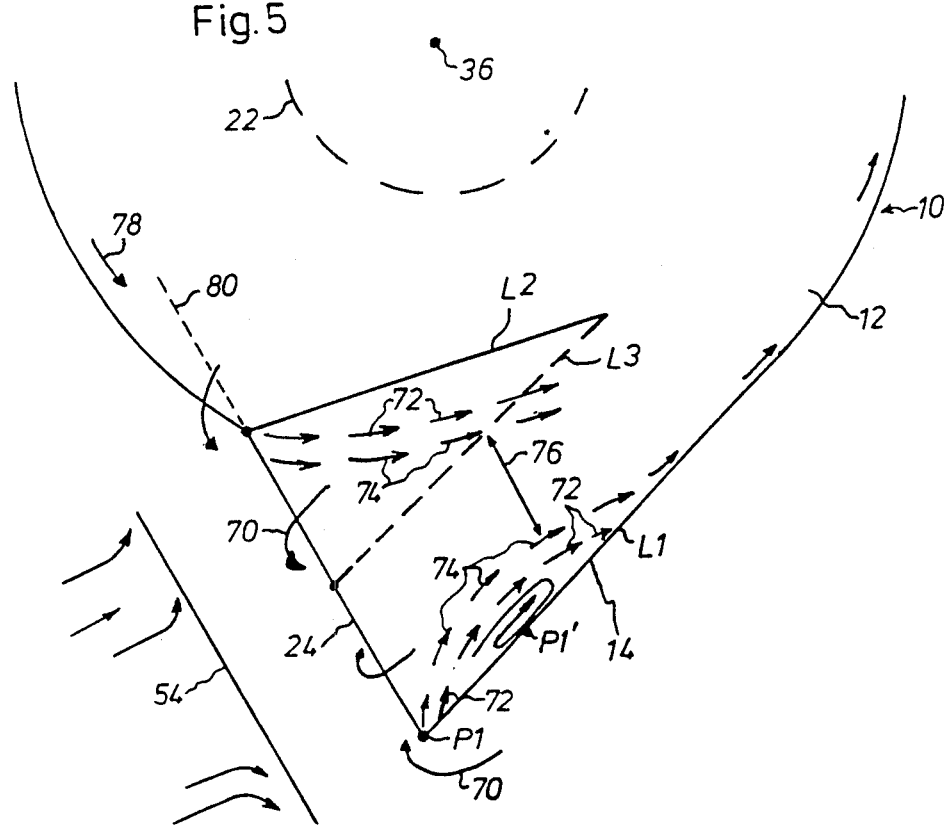
FIG. 5 shows on a larger scale the inlet portion of the flow controller according to FIGS. 2-4 and the principle of liquid flow contraction.

The function of the flow controller according to the invention will now be described in more detail, reference being had to FIG. 5 which shows a partly broken-away schematic view of the flow controller 10. As is clearly seen from this Figure, with respect to the line of symmetry 36 of the braking chamber 12, the radially outer boundary line L1 of the pipe member 14 is a tangential extension of the radially outer peripheral wall of the braking chamber 12 at a peripheral opening in the braking chamber. The pipe member 14 is in the form of a cylinder of circular cross-section, having a slit in its side, and the slitted portion of the pipe member connects onto an essentially parabolic peripheral opening into the braking chamber 12. This construction is previously known in and per se from DE-3,435,477. The line L2 in FIG. 5 represents the connecting line between the pipe member 14 and the braking chamber 12 and is inclined, with respect to the plane of the drawing, upwardly from left to right. Reference numeral L3 in FIG. 5 is a line on the circumference of the pipe member 14, which extends parallel to the longitudinal axis of said pipe member 14.

Because the inlet aperture 24 is defined only by the terminal edge of the circumference of the pipe member 14 and is completely immersed in the liquid to be controlled, there is obtained at the inlet aperture 24 a sharp edge over which the liquid 70 flowing in the aperture 24 is deflected. In this manner, there is obtained in per se known manner a substantial contraction of the cross-section of the liquid flow in the pipe member 14, as shown by the arrows 72 in FIG. 5.

In FIG. 5, reference numeral 54 indicates schematically the position of the liquid blocking means which is mounted in front of the inlet aperture 24 and which may be, for example, the conical disk shown in FIG. 4. The liquid blocking means 54 serves to prevent liquid flow directly from in front, i.e. in parallel with the line L3, into the pipe member 14. By the provision of the liquid blocking means 54, the liquid can flow to the inlet aperture 24 only from the side and from behind, which means that the liquid must be deflected through 90°–180° over the edge of the aperture 24 to be able to enter the pipe member 14. In comparison with the contraction which is obtained if no blocking means 54 is used, i.e. the contraction illustrated by the arrows 72 in FIG. 5, using the liquid blocking means 54 gives a far greater contraction, as shown by the arrows 74 in FIG. 5. By making the liquid blocking means 54 adjustable in respect of its distance to the inlet aperture 24, as shown in FIG. 4, the liquid flow through the inlet aperture can be controlled such that the desired contraction is obtained.

The active cross-section of the inflowing liquid, which is designated 76 in FIG. 5 and which is the cross-section of the liquid flow in the region where the contracted liquid flow encounters the liquid flow 78 rotating within the braking chamber 12, can thus be reduced considerably as compared with the cross-section of the inlet aperture 24. The liquid flow then continues through the peripheral aperture in the braking chamber 12 to be set in rotary motion therein. The rotation within the braking chamber 12 brakes the liquid in that it converts the pressure energy of the liquid into rotational energy within the braking chamber, whereupon the liquid is discharged through the outlet aperture 22.

For optimal utilisation of the contraction, it is preferred that the liquid flow within the pipe member 14 has its minimum cross-section in the region where the liquid flow encounters the liquid flow 78 rotating within the braking chamber. If the pipe member 14 were extended tangentially to the left in FIG. 5, the minimum cross-section of the liquid flow would lie farther to the left in the pipe member 14 and again be expanded to fully active cross-section before it encounters the rotating liquid flow 78. The velocity at which the liquid flow in the inlet pipe 14 encounters the rotating liquid flow 78 would in that case be far lower, for example by 50%, since the amount of liquid per unit of time through the pipe member 14 would not be changed, whereas the cross-section would have increased considerably.

It has been found that the inlet aperture 24 should be drawn in relatively far toward the peripheral opening in the braking chamber 12, and that an extension of the plane of the aperture 24 should extend through the braking chamber 12, as shown at 80 in FIG. 5. If the plane of the opening 24 were made more tangential, for example by moving the point P1 to the point P1', this would mean that the liquid flow through the pipe member 14 would adopt a more radial direction into the braking chamber 12, which in turn would cause the liquid flow to shatter the vortex formation.

When rain water flows down into the gully 26, the water will rise and enter the inlet aperture 24 and then the braking chamber 12 where is flows out through the outlet aperture 22 and the outlet duct 28 of the gully 26, said outlet duct determining the lowest water level 82 (FIG. 2). As long as the amount of liquid supplied per unit of time does not exceed the capacity of the brake at low pressure heads, there will be no proper braking effect because the water does not rotate efficiently within the braking chamber 12. If the amount of liquid supplied per unit of time exceeds the capacity of the flow controller 10, the water level will rise, and the water will flow toward the inlet aperture 24 from all sides, except from straight in front, which is due to the blocking means 54. The water coming from the side and from behind will thus be sharply deflected over the edge of the aperture 24 and describe an arc, whereby there is obtained, in the manner described above, a considerable contraction within the inlet pipe member 14. The increased inflow to the braking chamber 12 causes the water to build up a vortex-like turbulence which finally becomes a genuine vortex having its centre opposite the outlet aperture 22 when the air collected in the upper part of the braking chamber 12 has been expelled through the venting device.

The additional venting hole 68 in the outer pipe 62 lies at such a high level that the outer water surface has no time to block it before the air has escaped, and the tops of the pipes 60 and 62 are at such a high level that the inner water level in the outer pipe 62 is always below the tops of the pipes, also at maximum pressure. In this manner, there is formed an air pocket between the inner pressure at the upper periphery of the braking chamber and the outer water pressure, said air pocket preventing the water from passing this way. This arrangement eliminates the earlier problem that the venting hole had to be arranged above the highest water level which, at heavy rainfalls, lies above the grating 30.

Figure 8:
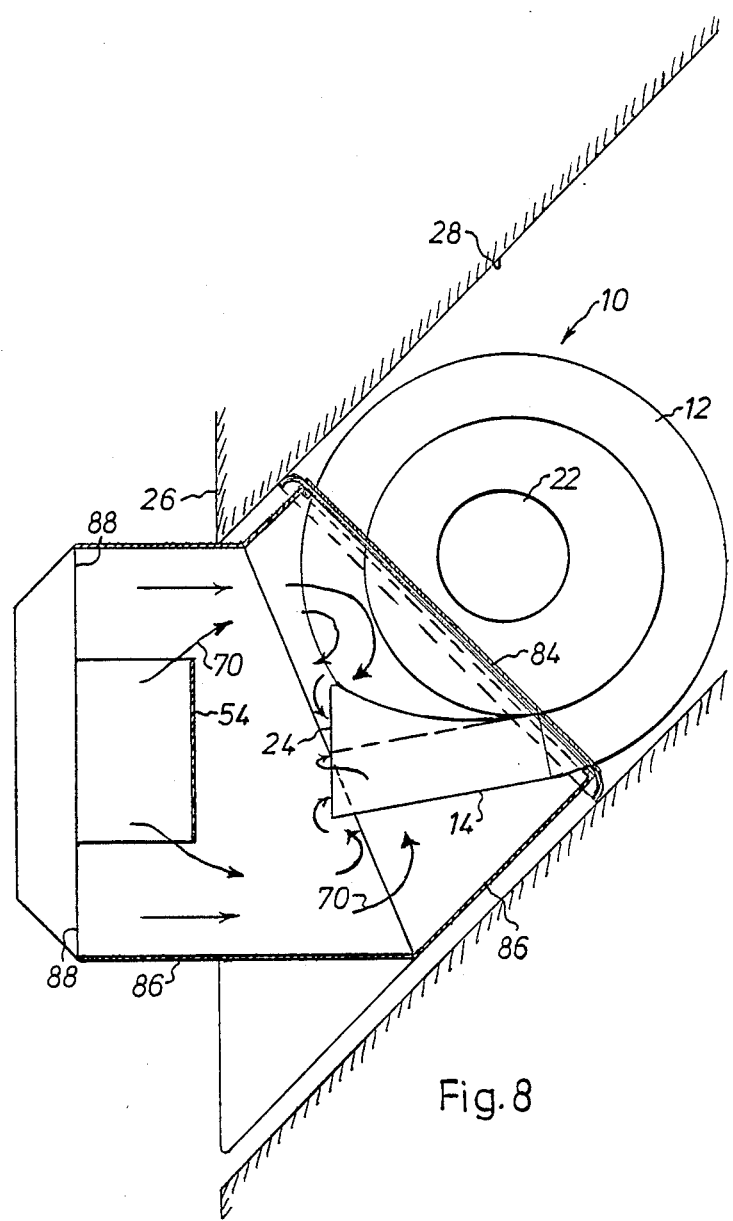
FIG. 8 is a view of a flow controller according to the invention, provided with a liquid blocking means according to a second embodiment.

Reference is now made to FIG. 8 which illustrates another embodiment of the liquid blocking means 54 according to the invention. In FIG. 8, the actual controller 10 is mounted in the outlet duct 28 of a gully 26, and a tubular housing is mounted around the inlet portion of the controller 10, which includes the inlet aperture 24. The housing comprises on the one hand a rear wall 84 sealingly engaging the pipe member 14 and the braking chamber 12 behind the inlet aperture 24 and, on the other hand, a tubular wall 86 extending from the rear wall 84 past the inlet aperture 24 and the liquid blocking means 54 toward the gully 26. The tubular wall 86 carries the liquid blocking means 54 which here is a circular stationary disk. Between the liquid blocking means 54 and the wall 86 openings 88 are provided which are so designed that the liquid flow is directed in a path essentially parallel to the pipe member 14 past the liquid blocking means 54 and the inlet aperture 24, whereupon the flow follows an essentially S-shaped path toward the rear portion of the housing, back toward the inlet aperture 24 of the pipe member 14 and over the edge of said pipe member.

The main advantage of this construction is that substantially the entire liquid flow 70 is made to arrive from behind and describe a curve of 180° at the edge of the inlet aperture 24, whereby maximum contraction is obtained.

Figure 9:
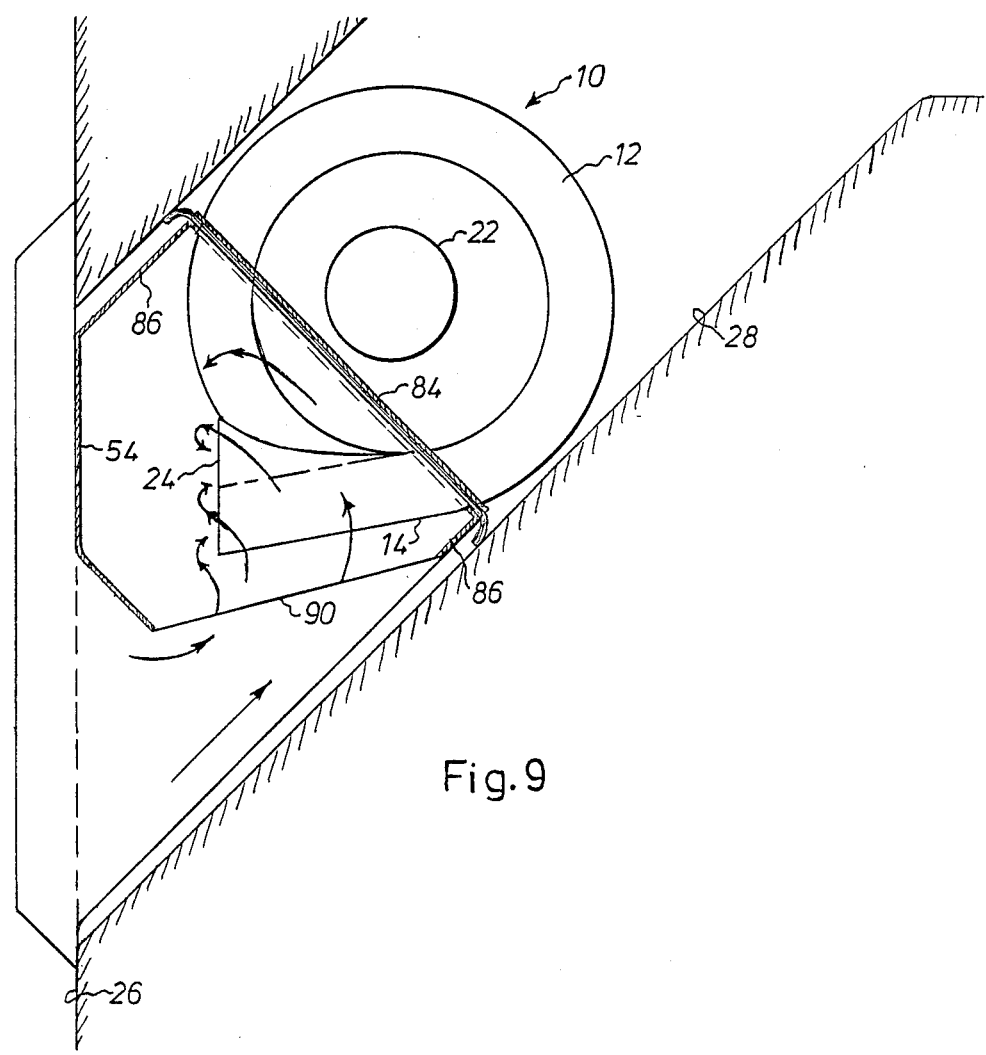
FIG. 9 is a view of the flow controller according to the invention, provided with a third embodiment of a liquid blocking means.

Reference is now made to FIG. 9 which illustrates a third embodiment of the liquid blocking means 54 according to the invention. In this embodiment, the liquid blocking means 54 is part of the tubular wall 86, and the liquid passage openings 88 of FIG. 8 have been replaced by a single large liquid passage opening 90 so arranged that only a unilateral liquid flow to the inlet aperture 24 is possible. A passage opening 90 of this size brings the advantage that larger objects can pass through the entire arrangement, which, as has been mentioned in the introduction to this specification, is one of the aims of this invention.

Naturally, the invention must not be regarded as limited to the embodiments described above and illustrated in the drawings, and it will be appreciated that the invention can be modified in a number of ways within the scope defined by the appended claims. For example, the braking chamber 12 may have a different shape than the flat cylindrical shape illustrated. The end wall 16 having the outlet aperture 22 may consist of, for example, a larger frustoconical wall portion to form a so-called cyclone brake where the liquid is introduced tangentially at the broad base 18 of the braking chamber and then is set in spiral motion along the line of symmetry 36 up to the outlet aperture 22.

Furthermore, the liquid blocking means 54 can be designed in a variety of ways and still give the desired contraction-enhancing effect. In its simplest form, such a liquid braking means may be, for example, a blocking plate separated from the braking chamber 12 and the inlet pipe member 14 and fixedly connected to the wall of the gully 26. Upon installation of the controller, such a blocking plate preferably is secured at a suitable distance from and at a suitable angle relative to the inlet aperture 24.

I claim:

1. A flow rate controller comprising a braking chamber having an essentially centrally arranged outlet aperture and being essentially symmetrical in respect of rotation relative to a line of symmetry perpendicular to a plane through said outlet aperture, said controller being adapted to receive, through a peripheral aperture within said braking chamber, a liquid flow to be controlled, in order to brake the liquid by causing it to rotate within said braking chamber, said controller for restricting the amount of liquid entering said peripheral opening per unit of time comprising the combination of (a) a pipe member which is connected to said braking chamber and whose, in relation to the line of symmetry of said braking chamber, radially outer boundary line L1 constitutes an essentially tangentially extension of the periphery of said braking chamber, said pipe member having at its free end an inlet aperture defined by the entire terminal edge, or parts thereof, of the circumference of said pipe member, the length of said pipe member being selected such that a contraction of the cross-section of the liquid flow in said pipe member, caused by the deflection of said liquid flow over the terminal edge or said parts of said terminal edge at said inlet aperture, is fully developed in the region where the liquid flow in the pipe member encounters the essentially rotary liquid flow within said braking chamber; and (b) a liquid blocking means mounted at a distance from said pipe member in front of said inlet aperture in order to increase the deflection of said liquid flow at said inlet aperture, thereby to enhance the liquid flow contraction formed within said pipe member.

2. A flow rate controller as claimed in claim 1, wherein the inlet portion of said pipe member, comprising said inlet aperture, is built into a housing sealingly connected to said braking chamber or said pipe member behind said inlet aperture and extending forwardly past said inlet aperture toward said liquid blocking means, and one or more liquid passage openings are arranged between said liquid blocking means and said housing so that the liquid flow is directed in a path essentially parallel to said pipe member past said liquid blocking means and said inlet aperture, whereupon it follows an essentially S-shaped path toward the housing rear portion back toward said inlet aperture of said pipe member, and over the edge of said inlet aperture.

3. A flow rate controller as claimed in claim 1, wherein the distance between said liquid blocking means and said inlet aperture is variable.

4. A flow rate controller as claimed in claim 3, wherein said liquid blocking means is a disk arranged in parallel with the plane of said inlet aperture and being fixedly connected, at its side facing away from said inlet aperture, with one end of a threaded shaft which via a corresponding threaded bush is carried by a stationary holder.

* * * * *